United States Patent [19]
Bunger

[15] 3,665,714
[45] May 30, 1972

[54] CANAL CHECK GATE
[72] Inventor: Mills E. Bunger, Wheatridge, Colo.
[73] Assignee: William J. Laipple, Sturgeon Bay, Wis.; a part interest
[22] Filed: Sept. 24, 1970
[21] Appl. No.: 75,112

[52] U.S. Cl. ........................................ 61/23, 61/25, 61/28, 61/29
[51] Int. Cl. ................................................ E02b 7/40
[58] Field of Search .......................... 61/23, 25, 26, 22, 24, 29

[56] References Cited
UNITED STATES PATENTS
| 3,300,985 | 1/1967 | Humphrey et al. | 61/25 |
| 2,984,986 | 5/1961 | Hill | 61/25 |
| 329,728 | 11/1885 | Galloway | 229/27 |
| 1,130,097 | 3/1915 | Meikle | 61/24 |
| 3,066,490 | 12/1962 | Dubouchet | 61/25 |

FOREIGN PATENTS OR APPLICATIONS
| 549,932 | 1958 | Italy | 61/25 |
| 217,965 | 1961 | Austria | 61/25 |

Primary Examiner—Jacob Shapiro
Attorney—Richard D. Law

[57] ABSTRACT

A pivotally mounted apertured plate gate swings automatically downward to restrict flow in a canal with increasing water flow and automatically swings upwardly as canal flow decreases so as to maintain a generally constant head downstream in the canal. The automatic action is accomplished through the cooperation, with the apertured plate, of a plate counterweight structure, valved tank for receiving water through the plate aperture, and a sliding blade gate controlling inflow through the plate aperture. Manual control is also possible.

8 Claims, 4 Drawing Figures

Patented May 30, 1972

INVENTOR
MILLS E. BUNGER
BY
Richard D. Law
ATTORNEY

INVENTOR
MILLS E. BUNGER

CANAL CHECK GATE

Today, water is a critical resource in the United States. The available supply of potable water must be used prudently. Indeed, as the human population of this nation steadily increases, all water must be used more efficiently. This need for efficiency implies that non-potable or reclaimed water must be put to greater use. Man-made canals and streams are irrigating more and more land today. Particularly this is true in the arid states of the United States where man-made irrigation techniques have provided more uniform crops from season to season, and have rendered previously uncultivatable land verdurous. In these arid states, water rights are determined by appropriation, not as a riparian right. Water is expensive, and others with rights to the same water are extremely interested in the amount and duration of water taken by another user. Thus, water which is used in irrigation channels, canals or streams must be efficiently and controllably used and diverted.

In general, the present invention provides a check gate for wasting or regulating water in a canal or waterway. The invention is made for outside use, is adaptable to large or small canals, fast or slow streams, and continues to function satisfactorily during long periods without attendance or maintenance. The invention meters and regulates to produce a constant head in a canal or waterway. Constant hydraulic head is important not only for maintaining a generally constant flow through irrigation canals so as to maximize the beneficial effect of the irrigating water, but, also, is important where certain hydraulically powered mechanisms are used downstream from the gate. In such cases, constant head means that generally constant power will be supplied to such mechanisms so they can function smoothly and evenly for prolonged periods. In addition to metering and regulating, the gate invention is easily manually moved to a selected closed position so that it causes all the water in the canal or natural stream to flow out of a radial spillway gate opened by water collecting against the gate of the invention.

Included among the objects and advantages of the present invention is to provide a gate for diverting and/or regulating water flow in a canal or waterway.

Another object and advantage of the invention is to provide a gate which automatically regulates water flow to produce a generally constant head in a waterway downstream from the gate.

A further object of the present invention is to provide an economically fabricated and maintenance-free gate apparatus to automatically regulate flow in a waterway.

Yet another object is to provide a gate apparatus readily adaptable to use in channels, canals, streams, and other waterways which vary in size and/or flow velocity.

Still another object and advantage provided by the present invention is a gate apparatus which may be easily and conveniently set to automatically produce a constant head and which may, also, be manually operated.

A still further object and advantage of the invention is to provide a gate apparatus for regulating flow which may be readily used in combination with a spillway, non-regulating, radial gate.

These and other objects and advantages of the present invention may be readily ascertained by referring to the following description and appended illustrations in which.

Figure 2:
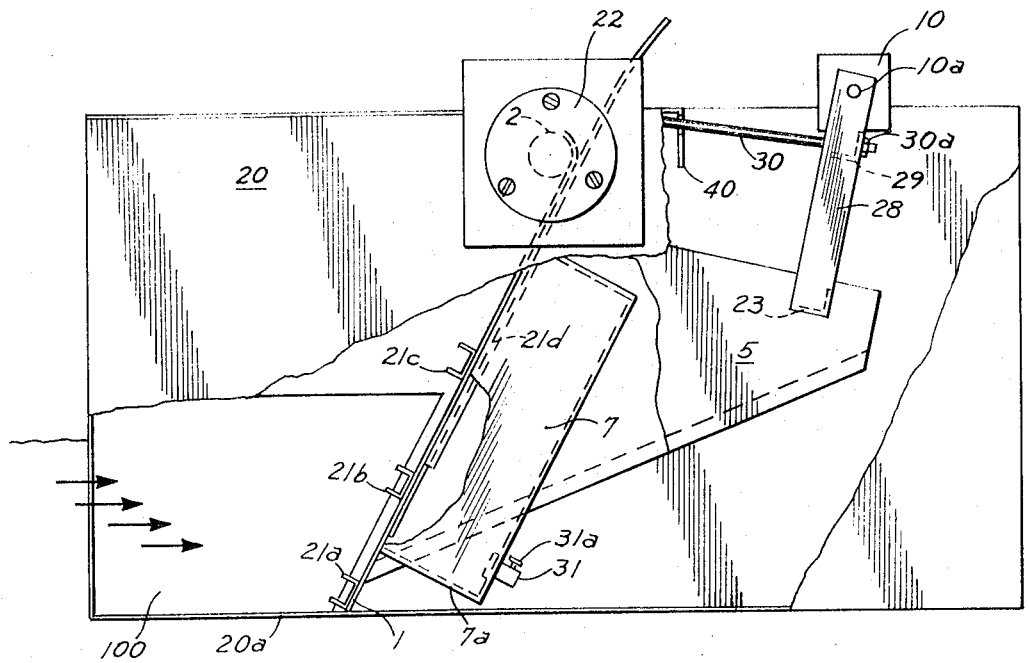
FIG. 2 is a side elevational view, partially cut-away, of the apparatus of FIG. 1.

The basic structure of the apparatus of the invention is best understood by referring first to FIG. 2 showing gate plate 1 suspended inside housing 20 placed in a channel having flow in the direction of the arrows. The housing may be a steel or concrete housing integral with the apparatus, or it may be understood as the concrete or metal sides and bottom of a man-made canal or channel. Gate plate 1 is a large, generally rectangular steel plate whose dimensions and thickness are determined by the size and characteristics of the channel or canal in which it is used. The plate may have structural steel members, such as members 21a, 21b, 21c, and 21d, welded or otherwise fixed to it giving the plate 1 the necessary rigidity and strength for withstanding the water flow without distortion. The gate plate is rigidly fixed to steel shaft 2 which is, in turn, rotatably mounted in bearing sets 22. Steel shaft 2, a conventional heavy shaft, is an elongated member having circular transverse cross-sectional at least at both of its opposed ends, and plate 1 may be welded, bolted, or otherwise rigidly fixed to shaft 2. The bearing races 22 may be any one of a variety of bearing assemblies conventionally used for rotatably supporting the ends of the shaft. Since the apparatus is used outdoors, a weather-proof assembly 22 is suggested. Plate 1 should be suspended in such a position as to hang nearly vertical when in a closed position bearing against the bottom 20a.

Figures 1, 4:
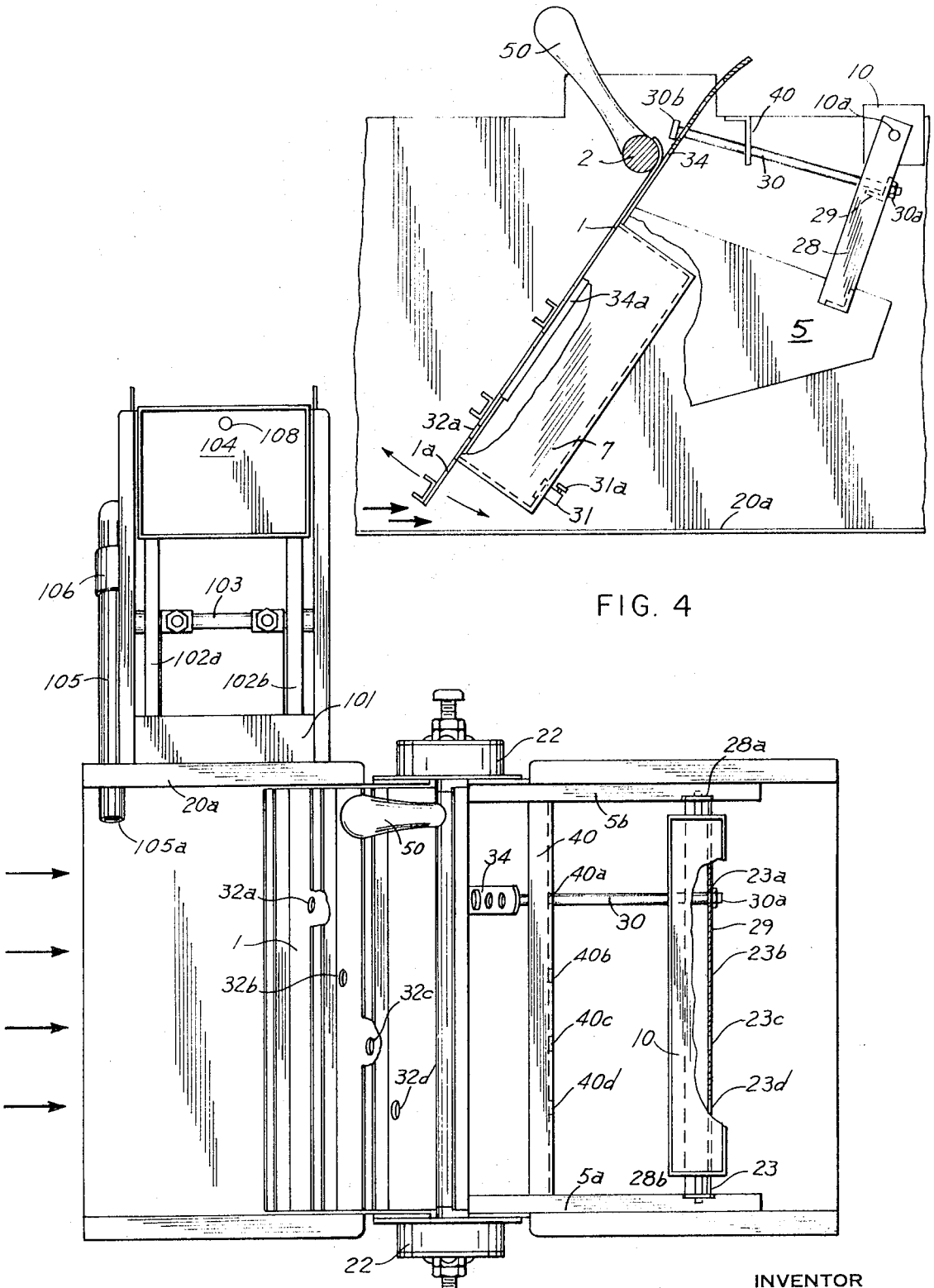
FIG. 1 is a top plan view of the apparatus according to the invention.
FIG. 4 is a side detail, partially cut-away of the device of FIG. 1.

To the rear side of plate 1, i.e., the downstream side, is rigidly fixed vented tank 7. As shown in FIGS. 1 and 2, tank 7 has a generally rectangular shape, but tank bottom 7a may have any of a number of configurations. As shown, the dimensions of tank 7, particularly the distance it extends away from the back of plate 1 and the proximity of tank bottom 7a to the bottom end of plate 1 near member 21a, should be such that tank 7 does not impinge on the surface of the flowing water in the channel before the water strokes plate 1; nor should the dimensions of tank 7 restrict the complete closure of plate 1 against housing bottom 20a. Communicating through an outlet with the interior of the tank near its bottom 7a is valve 31, manually operable by handle 31a for exhausting the contents of the tank through hose 31b into the downstream flow or outside of the channel. The valve and its cooperation with the other elements of the structure will be later explained in detail.

Figure 3:
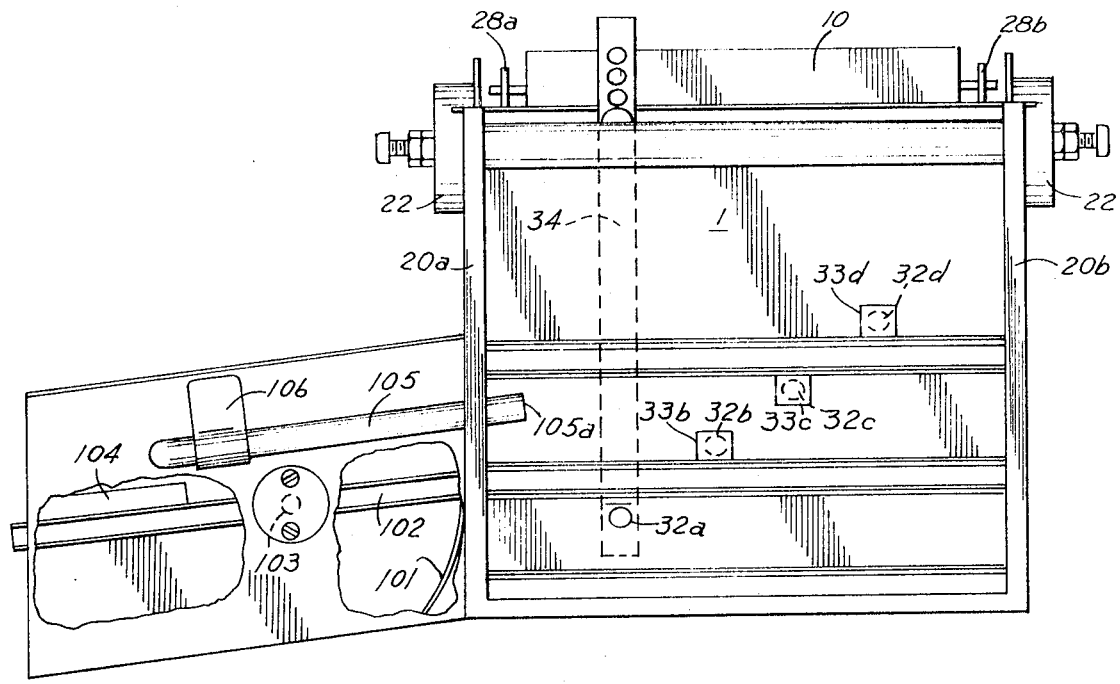
FIG. 3 is a front elevational view, partially cut-away, of the apparatus according to the invention.

Also, fixed to the rear of plate 1 is truncated A-shaped frame 5. One such A-shaped frame is fitted as by welding, bolts, etc., near each side edge of the plate. Thus the A-shaped frames 5 of FIG. 2 are represented as opposed members 5a and 5b in FIG. 1. Near the apex end of the A-shaped frames is fixed structural cross member 23 spacing apart the A-shaped frames and adding structural rigidity. This cross member may be, for example, conventional angle member, channel member, or I beam. Near cross member 23 on the A-shaped frames is further rigidly fixed two generally vertical posts 28, one post near each end of the cross member. In FIGS. 1 and 3, the vertical posts are represented as posts 28a and 28b respectively. At the upward ends of posts 28a and 28b is pivotally attached therebetween receptacle 10. This receptacle may simply be an open-topped rectangular container as illustrated, which is conventionally pivotally mounted to the posts by pivot pins 10a at opposed ends on the posts 28, such that the container is free-swinging, and the plane of its open top is horizontal.

Depending between the posts is apertured flange 29 which guides slidable rod 30 mounted therein. Rod 30 has at its end a stop 30a stopping the rod end from slipping through the aperture in flange 29. This rod opens slide valve 34, explained below.

The front of gate plate 1, FIG. 3, has a plurality of apertures 32a, 32b, 32c, and 32d, each of which provides communication through the plate to rear mounted tank 7. Each of these holes may be selectively plugged by means such as plate plugs 33b, 33c, and 33d or equivalent plug means. These plugs may be apertured to receive studs mounted on gate plate 1 and secured to that plate by nuts; a number of other conventional ways of plugging the gate plate apertures may also be used. During operation of the apparatus of the invention, one aperture (shown as aperture 32a) is left unplugged and the amount of water which may enter tank 7 through that aperture is automatically controlled by the blade gate 34. Such a blade gate is an elongated, essentially rectangular strip of heavy metal slidably disposed in a conventional slide track 35 rear mounted on gate plate 1 (FIG. 4).

A conventional radial gate apparatus may be used in combination with the apparatus of the invention, FIG. 3. The radial gate apparatus comprises a balanced radial or arcuate gate member 101 which acts as a selective closure for spillway opening 100, FIG. 2, the plate being rigidly fixed to support members 102 which are, in turn, rotatably mounted on shaft 103.

Support member 102 is shown in FIG. 1 as comprising parallel support members 102a and 102b respectively. The support members extend beyond shaft 103 to counter-balance bucket 104. The weight distribution of the radial gate apparatus is such that radial gate 101 is in a down or closed position when bucket 104 is empty; however, when bucket 104 begins to fill with water, the added weight will raise pivotally gate 101 and allow water to flow out the spillway 100. The filling of bucket 104 is accomplished by means of pipe 105 which communicates between an area in front of plate gate 1, where it may be supported by frame side 20a, and empties into bucket 104 being supported by means such as conventional hanger 106. When plate gate 1 is closed or when water otherwise builds up in front of the plate gate, upon the water buildup reaching the height of pipe 105 opening 105a, water will run through the pipe 105 on into bucket 104. Then, gate 101 will open allowing the built up water to waste out the spillway. By having a small, open drain aperture 108 in bucket 104 (FIG. 1), water will drain from the bucket so that when the water level before plate gate 1 falls below pipe opening 105a, radial gate 101 will slowly close. Because the water depth upstream of plate gate 1 is a function of the operation of the plate gate, the operation of the radial gate apparatus is, too, dependent upon the operation of the plate gate and works in combination therewith.

The operation of the apparatus of the invention is best understood by referring to FIG. 4, which shows plate gate 1 rigidly fixed rotating shaft 2. Blade gate 34 is slidably mounted in slide 34 affixed to the rear of gate 7 inside vented tank 7. Slidable shaft 30 is shown extending from flange 29 on post slidably through an aperture slot in fixed fulcrum cross member 40, and slidably through a appropriate hole formed in the upward end of blade gate 34. The end of rod 30 adjacent the blade gate has a stop 30b similar to stop 30a at the opposed end of the rod. If desired, the stops 30a and 30b may be adjustable stops, such as nuts threadably engaged on the rod ends. Fulcrum cross member 40 is a strong beam which may have many configurations, an L beam is shown, that has a slotted aperture therein slidably containing bar 30. Fulcrum member 40 is rigidly fixed between frame side 20a and 20b.

The curved arrows show the pivotal motion of gate 1 about shaft 2. Water flowing in the channel will exert a force generally downstream, in the direction of the horizontal arrows. In the absence of hydraulic pressure against gate 1, the gate may be balanced in any desired equilibrium position by selectively adding weights to free-swinging receptacle 10. The more weights added into the receptacle, the higher gate 1 will swing above floor 20a. The weights will be safely contained in the receptacle 10 because it is freely pivoted at 10 so as to not be tilted to let the weights fall out. As gate 1 swings upwardly, for example, flange 29 will bear against stop 30a of rod 30 and since member 40 is a fixed fulcrum the opposed end of rod 30 at stop 30b will move generally upwardly and to the right in FIG. 4. This upward motion of stop 30b on the end of bar 30, in turn, pulls blade 34 upwardly. The length of blade 30 is arranged such that in its most upward position aperture 32a is uncovered, while in the most downward position of blade 34 (and gate 1), aperture 32a is covered. The aperture 32a is progressively uncovered at intermediate positions. By forming a plurality of rod receiving separate apertures along the length of blade 34 adjacent its upward end, rod 30 can be positioned in blade 34 so that the lower end of blade 34 will only extend a short way past a chosen aperture when the gate 1 is in a closed position, and so, for example, that particular aperture 32a is uncovered as the gate 1 pivots upwardly.

The operation and functioning of the gate can be understood by first considering a steadily flowing stream, gate 1 balanced in an equilibrium pivoted position angled downwardly and into the flow so that gate tip 1a is slightly above the water line or slightly dipped into the water. In this position, blade 34 is arranged such that aperture 32a partially open. If the stream flow remains constant, the gate assembly will not move. But, assume the water flow increases. If the stream flow increases by way of increased velocity without heightened water level, then there will be increased force on the lower end of plate 1 pivoting it downwardly restricting the stream flow and, thereby, cause the downstream flow to decrease to the original flow. On the other hand, if the upstream water level increases, not only will there be increased pressure on the lower gate portion, but water will begin to flow through the open aperture 32a into tank 7. The weight of water in tank 7 will pivot the gate downwardly into the stream and, thereby, restrict downstream flow. As the plate 1 pivots downwardly, blade gate 34 also moves downwardly and slides relative to plate gate 1 so as to cover aperture 32a. Thus, when aperture 32a is completely below the water line, the blade gate 34 slides down and completely closes the aperture. When the flow upstream subsides, the water held in tank 7 will flow out of the tank through valve 32 and hose 31b, i.e., as the water level in tank 7 exceeds the water level of the channel, tank water will be released. The outlet end of flexible hose 31b may be placed downstream or the hose may run through an opening in the housing wall so that the tank contents empty outside the apparatus of the invention. The amount and rate of discharge may be conveniently controlled by conventional valve control means 31a integral with valve 31.

It may be desirable to have gate 1 dipped well into the stream flow when in an equilibrium position, however, the low positioned aperture 32a could not function correctly, i.e., it could not be open when the water level rises. Therefor, a number of other apertures at progressively higher points on the plate 1 are provided. All but one of these apertures, FIG. 3, are usually blocked as aforementioned, and the blade gate 34 positioned and adjusted to control the unplugged aperture. To provide for a selectively positioned blade gate, a plurality of vertical slides such as slide 34 are affixed in a generally parallel relationship across the back of plate 1. Thus blade 34 may selectively be telescoped into any one of the slides. Rod 30 then is positioned in one of the aforementioned plurality of apertures at the rod end of the blade so that the blade functions in the prescribed manner to open or close the aperture associated with the slide into which the blade is telescoped. Of course, rod 30 must also be moved horizontally, which can be accomplished by having corresponding slots in transverse fulcrum member 40 and transverse flange 29. The effective length of rod 30 may, also, be varied easily by having either stop 30a or 30b threadably adjustable on the rod 30. The plurality of slots in cross-member 40 are shown in FIG. 1 as 40a, 40b, 40c, and 40d; likewise, flange member 23 has slots 23a, 23b, 23c, and 23d corresponding to plate apertures 32a, 32b, 32c, and 32d respectively.

Although in larger channels or canals the structure of the invention will necessarily have considerable mass, plate 1 is counter-balanced by weights placed in container 10 so that the gate is easily pivoted. Loose weights such as rocks, brick, metal, etc. may be simply thrown into container 10 to achieve the desired counter-balance and pivoted position. "A" frame 5 is formed from metal such as structural steel. Its lever arm length will depend upon the amount of weight needed to balance gate 1 and the longer the "A" frame, the less weight required. The dimensions of the "A" frame are, also, governed by how high the gate plate is to be lifted so that the counter-balance weights would not dip into the downstream flow. Gate 1 may, also, be equiped with a lever such as lever 50 in FIG. 4 for manual manipulation. When debris collects under the gate, it is convenient to be able to manually open or close the gate. The lever handle 50 may be rigidly fixed to shaft 50, protruding upward therefrom.

I claim:
1. A check gate for canals and like waterways comprising:
   a. a rotatable shaft mounted transversely across a canal;
   b. a pivoted, downwardly extending plate suspended from an upper portion thereof from said shaft with its surface arranged transversely across the waterway slanting upstream into the flow for restricting and stopping flow thereby and having at least one aperture formed therethrough;
   c. a water holding tank attached to the downstream side of said plate below said shaft and communicating with said at least one aperture in said plate;
   d. variable counterbalance means on the opposite side of said shaft from said plate arranged for balancing said plate for easy movement;
   e. outlet means communicating with said tank arranged for discharging water from said tank;
   f. movable, adjustable blade valve means interconnected with a fixed support arranged to selectively open said at least one aperture when said plate is in an upwardly pivoted position and to close said at least one aperture when said plate is in a downwardly pivoted position, so that when the canal water rises to said open aperture, water flows into said tank through said aperture weighting said plate swinging said plate downwardly restricting the water flow past said plate, and said aperture moves to closed position as said plate pivots downwardly until the water in said tank is discharged through said outlet means and said plate swings upwardly.

2. A check gate according to claim 1 wherein said plate has a plurality of vertically arranged apertures formed therein, and said blade valve means is an elongated member telescopically mounted in a slide track selectively positionable to cover and uncover at least one of said plurality of apertures, and plug means for plugging the other said apertures.

3. A check gate according to claim 1 wherein said counterbalance means comprises a frame rigidly supported from the downstream surface of said plate and container means pivotally suspended from said frame maintaining an upright position for containing loose weights.

4. A check gate according to claim 3 wherein said blade valve means comprises an elongated blade member, vertical slide track means fixed to the rear surface of said plate reciprocably supporting said elongated member adjacent the rear surface of said plate, a fixed cross member supported across the canal having a rod-accepting aperture formed therein, rod support means depending from said frame, a rod means fastened between said support means and the upward end of said elongated blade member and intermediarily through said rod accepting slot in said cross member, and stop means at the opposed ends of said rod, whereby movement of said frame causes relative movement between said rod and said plate to cause said elongated blade member to slide relative to said plate.

5. A check gate according to claim 4 further characterized by a plurality of apertures, including said at least one aperture, are transversely arranged at differing heights across said plate, and a plurality of said slide tracks each arranged to correspond to one of said plurality of apertures, said elongated blade member selectively telescopable into said slide tracks and having a plurality of rod adjustment holes spaced along its length near its upward end, said cross member having a plurality of rod accepting slots therein, each slot longitudinally aligned with one of said apertures, and said rod support means is an elongated member having a plurality of rod accepting holes therein, each said hole longitudinally being aligned with a corresponding one of said apertures.

6. A check gate according to claim 1 further characterized by having a radial, counter-balanced operated spillway gate in combination therewith, said spillway gate positioned upstream from said plate and operated by water backed up by said plate.

7. A check gate according to claim 1 wherein said outlet means in said tank is variable.

8. A check gate according to claim 1 wherein said water from said tank is discharged through a flexible tube to point outside said canal.

* * * * *